A. E. OSBORN.
TRANSMISSION GEARING.
APPLICATION FILED FEB. 2, 1910.
970,744.
Patented Sept. 20, 1910.
3 SHEETS—SHEET 2.
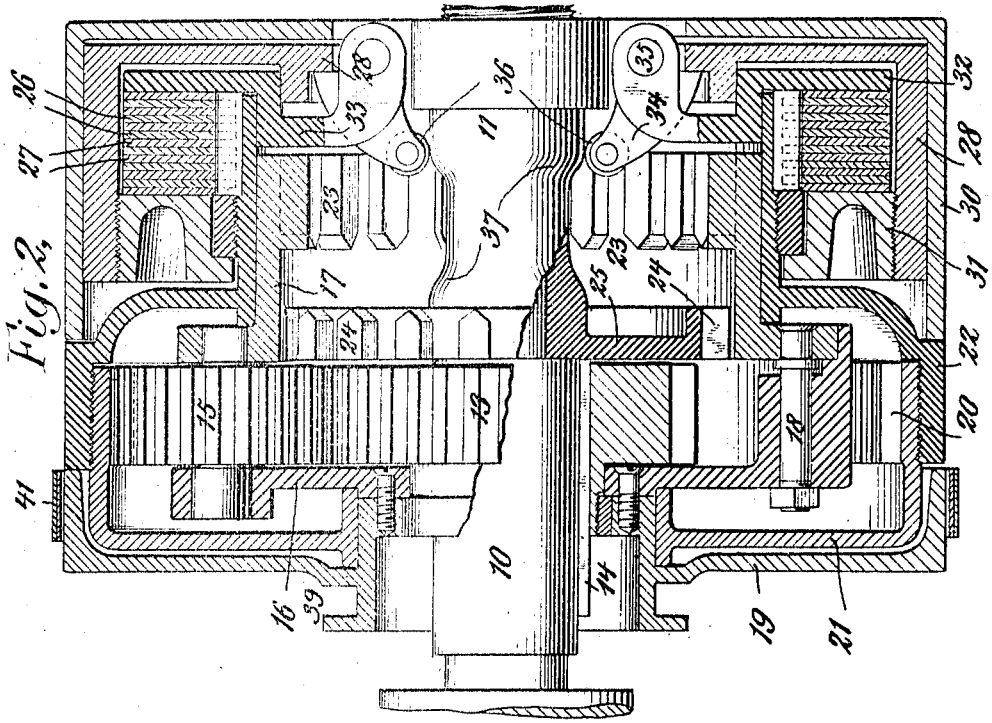
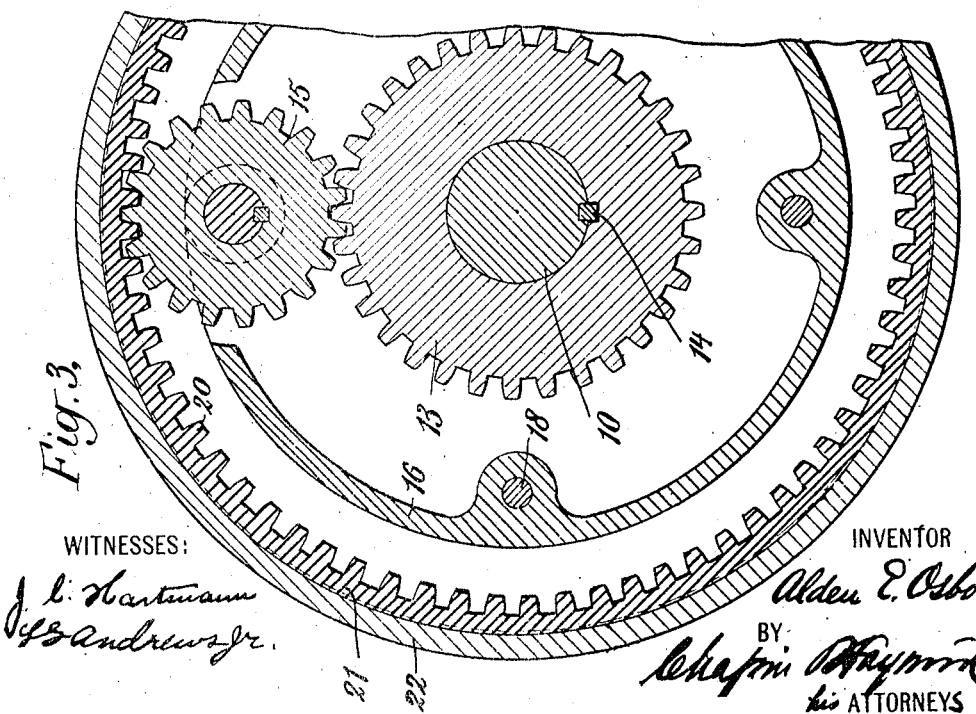
WITNESSES:
INVENTOR
Alden E. Osborn
BY
his ATTORNEYS A. E. OSBORN.
TRANSMISSION GEARING.
APPLICATION FILED FEB. 2, 1910.
970,744.
Patented Sept. 20, 1910.
3 SHEETS—SHEET 3.
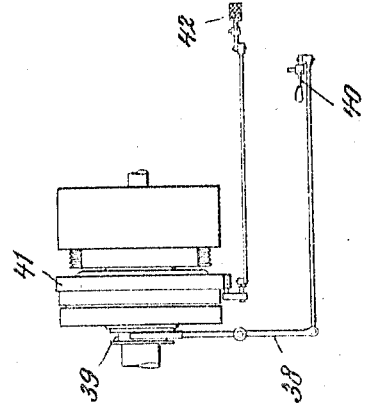
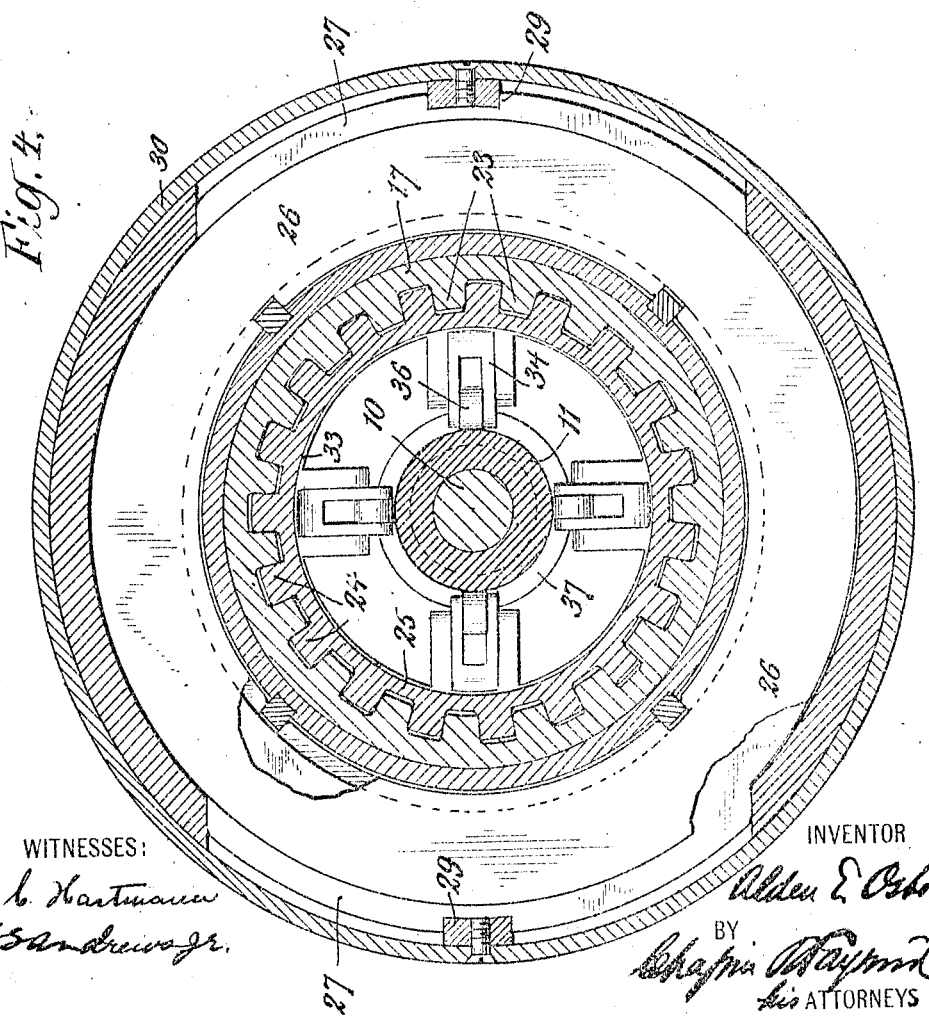
WITNESSES:
INVENTOR
Alden E. Osborn
BY
his ATTORNEYS

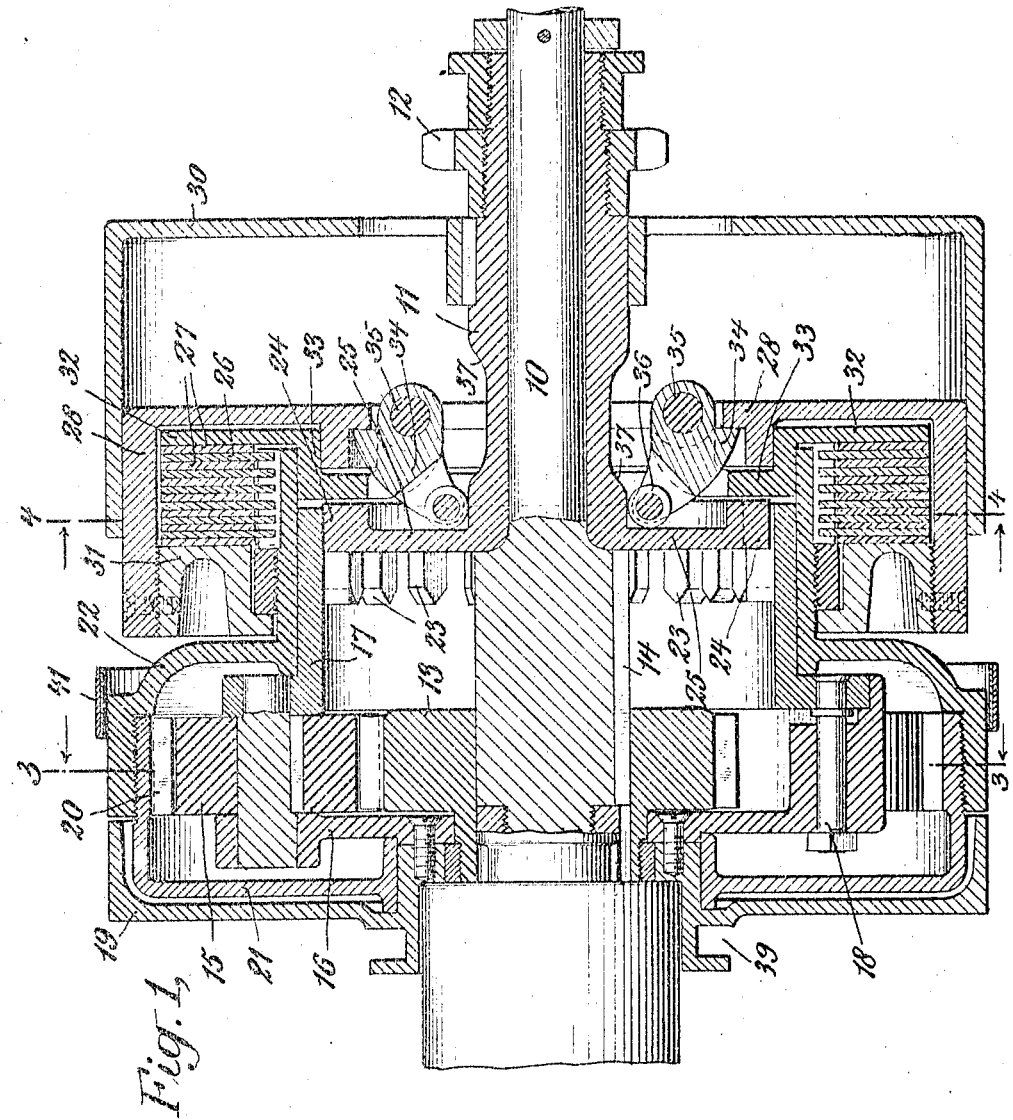

UNITED STATES PATENT OFFICE.

ALDEN E. OSBORN, OF NEW YORK, N. Y., ASSIGNOR TO CARLSON MOTOR & TRUCK COMPANY, OF PHILADELPHIA, PENNSYLVANIA, A CORPORATION OF NEW YORK.

TRANSMISSION-GEARING.

970,744.  Specification of Letters Patent.  Patented Sept. 20, 1910.

Application filed February 2, 1910. Serial No. 541,429.

*To all whom it may concern:*

Be it known that I, ALDEN E. OSBORN, a citizen of the United States of America, and a resident of New York, county and State of New York, have invented certain new and useful Improvements in Transmission-Gearing, of which the following is a specification, reference being had to the accompanying drawings, forming a part thereof.

My invention relates to improvements in transmission gearing of the type in which changes of relative speed and direction are effected between the driving and driven elements, and my invention relates particularly to the planetary type of transmission gearing in which an intermediate gear is given a planetary movement around a central or sun gear in addition to the rotational movement thereof about its own axis. In this type of gearing a plurality of clutches are employed for connecting the parts in different speed or direction relation, and means are employed for holding certain members against rotation,—one at a time,—and in the past it has been common to use several operating members for the clutches and usually more than one operating element for the brake mechanism employed for the aforesaid holding purposes.

In U. S. Letters Patent No. 773,414 which issued to me upon October 25, 1904, I disclosed a mechanism giving two speeds forward and one reverse in which but a single brake and brake lever was employed but in which two operating members were necessary to operate the clutches for obtaining the different speed or direction relations. In my present invention I employ but a single operating lever of the progressive type for operating the clutches to give a relationship of parts resulting in two speeds forward and one in reverse, and I employ but a single brake and brake operating member for holding either one of two rotatable elements from rotation.

My invention also consists in many novel details of construction and combinations of parts as will hereinafter more fully appear, and in order that my invention may be fully understood I will now proceed to describe an embodiment thereof having reference to the accompanying drawings illustrating the same, and will then point out the novel features in claims.

In the drawings: Figure 1 is a view in central longitudinal section through a transmission gearing constructed in accordance with my invention showing the same with its parts adjusted for low speed forward driving. Fig. 2 is a similar view showing the parts adjusted for high speed forward driving. Fig. 3 is a transverse sectional view upon the plane of the line 3—3 of Fig. 1. Fig. 4 is a transverse sectional view upon the plane of the line 4—4 of Fig. 1. Fig. 5 is a general diagrammatic view showing the connections from the transmission gearing to the controlling elements for the clutch and brake operating mechanism.

The driving element for the transmission gearing is in the form of a central shaft 10 which serves to support the mechanism as a whole, while the driven element is in the form of a sleeve 11 loosely mounted thereon and provided with a sprocket gear 12 by which its rotational movements may be imparted to other mechanism to be driven, such, for instance, as the driving wheels of a motor vehicle. Secured upon the shaft 10 to rotate therewith is a central or sun gear wheel 13, the same being permitted, however, a limited longitudinal movement thereon by means of the spline or feather connection 14. The teeth of the sun gear 13 are arranged in mesh with an intermediate or planetary gear 15 which is carried by an intermediate member loosely mounted coaxially with the drive shaft 10. This intermediate member comprises a flange 16 disposed upon one side of the gearing, a cylindrical head 17 disposed upon the other side of the gearing, the two parts being connected together by suitable bolts 18, and a drum 19 secured fast to the flange 16, the said drum having a periphery adapted for engagement with a brake band. The planetary gear wheel 15 besides being in engagement with the sun gear 13 is also in engagement with the teeth of a ring gear 20 also loosely mounted coaxially with the shaft 10, the part carrying the teeth of the said ring gear comprising a shell 21 and a drum 22, the latter having a peripheral portion in line with the peripheral portion of the drum 19 and also arranged for engagement with a brake band.

The clutch mechanism comprises two clutches, one disposed between the intermediate member which carries the planetary gear and the driven member, and the other disposed between the ring gear carrying member and the driven member. The former comprises clutch teeth 23 disposed upon the interior of the cylindrical head 17 of the intermediate member, and complementary teeth 24 upon the periphery of a flange 25 secured to the sleeve 11. The latter clutch mechanism comprises a set of friction disks 26 mounted to rotate with the drum 22 of the gear carrying member, and a complementary set of clutch disks 27 mounted to rotate with a head 28, and with a casing 30 through a spline connection 29 (see Fig. 4), the latter being secured fast to the driven sleeve 11. Endwise pressure between the two sets of disks to cause them to frictionally engage to such an extent that they will move together, is applied through the medium of two abutments 31 and 32, the former being carried by the head 28, and the latter being arranged as a part of a loosely mounted element 33. The two abutments are drawn together by means of operating arms 34 which are pivotally secured at 35 to the element 33, and are provided with projections which engage the head 28. The said operating arms are provided with antifriction cam following rollers 36 adapted for engagement with a cam portion 37 upon the sleeve 11. When the said cam followers are engaged by the rising portions of the cam 37 at either end thereof, the abutments are drawn together to press the clutch disks in holding engagement, while in an intermediate position the abutments are free to move slightly away from each other, whereby to relieve the clutch disks of such pressure and to permit said clutch disks to have relative rotational movements.

The clutches are operated by the bodily shifting of the three gear wheels, the parts carrying them, and the friction clutch disks and parts carrying them;—in fact, by the bodily shifting of all of the parts of the transmission gearing as a whole, except the driving shaft 10, the driven sleeve 11 and flange 25 with its clutch teeth 24, and the casing 30. The parts are thus shifted by means of a lever 38 which engages a collar 39 upon the drum 19, the said collar being connected by suitable connecting elements with a controlling lever 40. When the controlling lever is at the limit of its movement in one position the parts are in the position shown in Fig. 1 of the drawings, in which the clutch teeth 23 and 24 are in coengagement to lock the intermediate planetary gear carrying member and the driven sleeve together, and the operating fingers 36 are engaged by one of the rises of the cam 37 to operate the friction clutch to hold the ring gear also in driving relation with the intermediate member. As the result of the foregoing is to lock two of the gear carrying members together as well as to the driven sleeve, it will have the effect of locking up the entire gear train so that the whole planetary gearing will rotate together as a unit, and high speed forward driving will result. At the extreme opposite position of the controlling lever 40 the parts moved thereby will be shifted to the position in which they are shown in Fig. 2. In such position the friction clutch is operated by reason of the fact that the operating arms 36 are in engagement with the opposite rise of the cam 37, but the complementary clutch teeth 23 and 24 upon the intermediate and driven members respectively will be out of engagement, whereby the two said members will be released from direct rotative engagement with each other. If means be operated to hold the intermediate planetary gear carrying member against rotation, reverse driving movements at a low rate of speed will result. The holding of the intermediate planetary gear member stationary will result in the planetary gear wheel 15 operating merely as an intermediate reversing idler whereby the driving movements of the sun gear 13 will be transmitted in a reverse direction and at a reduced rate of speed to the ring gear 20, and the said ring gear being in rotative engagement through the friction clutch 26—27 with the driven sleeve, the said sleeve will be rotated slowly backward.

In the intermediate position of the lever 40 the parts shifted thereby will be in a position midway between the positions shown in Figs. 1 and 2. In such a position the clutch teeth 23 and 24 upon the cylindrical head 17 and flange 28 respectively will be in engagement,—that is to say, the parts will not have been moved sufficiently from the position in which they are shown in Fig. 1 to cause their disengagement, so that the intermediate member and driven sleeve will be connected together, but the operating arms being in their intermediate position will be out of engagement with the rises of the cam 37, and the friction clutch disks 26—27 will be relieved of endwise pressure. This will disconnect the ring gear from direct rotative engagement with the driven member and if means be applied to the said ring gear to hold the same stationary, forward driving movements at a low rate of speed will result. The rotational movements of the sun gear 13 imparted to the intermediate planetary gear 15 will result in an orbital movement of the said gear wheel about the axis of the shaft 10, in addition to a rotational movement about its own axis, and the result of this will be to carry the member in which it is mounted, around forward at a low rate of speed, and such movements will be imparted directly to the driven sleeve through the coengaging clutch teeth 23—24.

From the foregoing it will be seen that by the simple operation of the lever 40 progressively the clutch mechanism may be controlled, so that either or both of the clutches may be operated at will, and further, that the movement of the lever to its limit in one direction will adjust the clutch mechanism for forward driving at high speed, the movement of the lever to an intermediate position will adjust the mechanism for forward driving at low speed, and the movement of the lever to its limit in the opposite direction will adjust the mechanism for reverse driving connection.

The means for holding either of the drums 19 or 20 against rotation is preferably a single brake band 41, for the operation of which I have shown a foot pedal 42. This brake is not used at all for high speed driving, except that it may be used as an auxiliary brake for the gearing as a whole,—in other words, because the transmission gearing rotates as a unit in high speed driving, the operation of such brake band will slow down or stop the gearing as a whole, but it will not affect in any way the relative movement of the parts. When the parts are adjusted for low speed forward or reverse driving connection the axial shifting of the brake drums will cause, first, the brake drum 22 to be brought beneath the brake band 41, and then the drum 29 to be brought beneath it. Thus, when the parts are in an intermediate position and low speed forward driving is required, the operation of the brake band will hold the drum 22 stationary, as is desired, while when the parts are in the position (shown in Fig. 2) for reverse drive the application of the brake will hold the drum 19 stationary as is necessary.

From the foregoing it will be seen that I obtain a complete control of the transmission gearing by the operation of a single lever and a single brake member. For high speed forward the lever is pushed all the way over to the limit of its movement in one direction. For low speed forward the lever is pushed to an intermediate position and the pedal operated, and for reverse drive the lever is moved to the limit in the other direction and the brake pedal operated.

What I claim is:

1. The combination with driving and driven elements, two brake drums, gearing connecting the brake drums and one of the said elements, and clutches for connecting either or both of the said drums with the other said element, of a single brake for the two said drums, and a single operating element adapted to operate both of the said clutches when in one position, one of them when in another position, and the other of them when in a third position.

2. The combination with driving and driven elements, two brake drums, gearing connecting the brake drums and one of the said elements, and clutches for connecting either or both of the said drums with the other said element, of a single brake for the two said drums, and a single operating element adapted to operate both of the said clutches when at the extremity of its movement in one direction, one of them when at the extremity of its movement in the opposite direction, and the other when in an intermediate position.

3. The combination with driving and driven elements, two drums, gearing connecting the drums and one of the said elements, and clutches for connecting either or both of the said drums with the other said element, of means for holding either of the said drums against rotation, and a single operating element adapted to operate both of the said clutches when in one position, one of them when in another position, and the other of them when in a third position.

4. The combination with driving and driven elements, two drums, gearing connecting the drums and one of the said elements, and clutches for connecting either or both of the said drums with the other said element, of means for holding either of the said drums against rotation, and a single operating elemnt adapted to operate both of the said clutches when at the extremity of its movement in one direction, one of them when in the extremity of its movement in the opposite direction, and the other one in an intermediate position.

5. The combination with driving and driven elements, two drums, gearing connecting the drums and the driving element together, and clutches for connecting either or both of the said drums with the driven element, of means for holding either of the two said drums against rotation, and a single operating element adapted to operate both of the said clutches when in one position, one of them when in another position, and the other of them when in a third position.

6. The combination with driving and driven elements, two drums, gearing connecting the drums and the driving element together, and clutches for connecting either or both of the said drums with the driven element, of means for holding either of the two said drums against rotation, and a single operating element adapted to operate both of the said clutches when at the extremity of its movement in one direction, one of them when in the extremity of its movement in the opposite direction, and the other when in an intermediate position.

7. The combination with driving and driven elements, two brake drums, gearing connecting the brake drums and the said driving elements, and clutches for connecting either or both of the said drums with the said driven element, of a single brake for the two said drums, and a single operating element adapted to operate both of the said clutches when in one position, one of them when in another position, and the other of them when in a third position.

8. The combination with driving and driven elements, two brake drums, gearing connecting the brake drums and the said driving element, and clutches for connecting either or both of the said drums with the said driven element, of a single brake for the two said drums, and a single operating element adapted to operate both of the said clutches when at the extremity of its movement in one direction, one of them when at the extremity of its movement in the opposite direction, and the other when in an intermediate position.

9. In transmission gearing the combination with coaxially disposed driving, driven, and intermediate elements, and planetary gearing comprising a central gear wheel secured to rotate with the driving element, a planetary gear wheel carried by the intermediate element, and a ring gear surrounding the central gear wheel, of a clutch for connecting the driven element with the intermediate member, another clutch for connecting the driven element with the ring gear, and means for operating the clutches adapted to operatively connect one of the said clutches when in one position, the other when in another position, and both when in a third position.

10. The combination with driving and driven elements both of which are longitudinally stationary, intermediate power transmitting elements longitudinally movable between them, the said intermediate elements including a sun gear, a planetary pinion, a carrier therefor, and a ring gear surrounding the said pinion and sun gear, of a clutch between the driven member and the ring gear, means for operating the said clutch when the said intermediate elements are moved to the limit of their movements in either direction and to leave the said clutch free in an intermediate position, a clutch between the said planetary gear carrier and the driven element, and restraining means for the said planetary pinion carrier and the said ring gear.

11. The combination with driving and driven elements both of which are longitudinally stationary, intermediate power transmitting elements longitudinally movable between them, the said intermediate elements including a sun gear, a planetary pinion, a carrier therefor, and a ring gear surrounding the said pinion and sun gear and concentric with the sun gear, of a clutch between the driven member and the ring gear, an annular cam carried by the driven element, and with respect to which the said power transmitting elements are longitudinally movable, means operated by the said cam at the limit of the said longitudinal movements of the power transmitting elements with respect thereto in either direction, to operatively engage the said clutch, the said cam being arranged to release the said clutch when the parts are in an intermediate position with respect to the said cam, a clutch between the said planetary gear carrier and the driven element, and restraining means for the said planetary pinion carrier and the said ring gear.

12. The combination with driving and driven elements both of which are longitudinally stationary, intermediate power transmitting elements longitudinally movable between them, the said intermediate elements including a sun gear, a planetary pinion, a carrier therefor, and a ring gear surrounding the said pinion and sun gear and concentric with the sun gear, of a clutch between the driven member and the ring gear, operating means therefor, an annular cam concentric with the driving and driven elements and arranged for engagement with the said operating means, the said operating means being longitudinally movable with respect to the said cam, the said operating means being engaged by the said cam at the limit of the said longitudinal movement in either direction, to operatively engage the said clutch, said operating means being freed therefrom to release the said clutch when in an intermediate position, a clutch between the said planetary gear carrier and the driven element, and restraining means for the said planetary pinion carrier and the said ring gear.

13. In transmission gearing the combination with two relatively rotatable members which are movable longitudinally together, of a single restraining means adapted for engagement with one or the other of the said members when so longitudinally moved, clutch mechanism automatically operated by the longitudinal movement of the said members to the limit of such movement in either direction, said clutch mechanism being free in an intermediate position of the said members, and other clutch means operatively engaged in the said intermediate position and in one of the said extreme positions of the said members.

14. In transmission gearing the combination with a driving element, a driven element, change speed gearing between them, and a casing, of clutch mechanism for connecting the said gearing in different driving relations, said clutch mechanism including a set of disks connected to rotate with the casing and another set of disks arranged to rotate with respect thereto, means for moving the disks longitudinally with respect to the casing, and abutments independent of the casing for pressing the said disks together.

15. In transmission gearing, the combination with a driving element, a driven element, change speed gearing between them, and a casing, of clutch mechanism for connecting the said gearing in different driving relations, said clutch mechanism including a set of disks connected to rotate with the casing and another set of disks arranged to rotate with respect thereto, means for moving the disks longitudinally with respect to the casing, and abutments independent of the casing for engaging the end disks of the two sets, and means for pressing the said abutments together.

16. The combination with driving and driven elements, two drums, gearing connecting the drums and one of the said elements, and clutches for connecting either or both of the said drums with the other said element, of means for holding either of the said drums against rotation, and a single operating element adapted to operate both of the said clutches when in one position, one of them when in another position, and the other of them when in a third position, and to simultaneously change the relationship of the drums and the holding means with respect to each other whereby one of the drums will be adapted to be engaged by the holding means when one of the clutches is operated alone, and the other of the drums will be adapted to be engaged by the holding means when the other of said clutches is operated alone.

17. The combination with driving and driven elements, two brake drums, gearing connecting the brake drums and one of the said elements together, and clutches for connecting either or both of the said drums with the other said element, of a single brake for the two said drums, and a single operating element adapted to operate both of the said clutches when in one position, one of them when in another position, and the other of them when in a third position, and to simultaneously change the relationship of the drums and brake with respect to each other, whereby one of the drums will be adapted to be engaged by the brake when one of the clutches is operated alone and the other of the said drums will be adapted to be engaged by the brake when the other of the said clutches is operated alone.

18. In transmission gearing the combination with driving and driven elements, two longitudinally movable drums, gearing connecting the drums and one of the said elements, and clutches for connecting either or both of the said drums with the other said element, of a single restraining means for the two said drums, means for shifting the drums longitudinally to bring one or the other of them to a position to be engaged by the brake, one of the said clutches being operated by the moving of the brake drums to one of their said positions and the other of said clutches being operated by the moving of the brake drums to the other of their said positions.

19. In transmission gearing the combination with driving and driven elements, two longitudinally movable drums, gearing connecting the drums and one of the said elements, and clutches for connecting either or both of the said drums with the other said element, of a single restraining means for the two said drums, means for shifting the drums longitudinally to bring one or the other of them to a position to be engaged by the brake, one of the said clutches being operated by the moving of the brake drums to one of their said positions, the other of said clutches being operated by the moving of the brake drums to the other of their said positions, and both of the said clutches being operated by moving the said drums beyond one of their aforesaid positions.

20. In transmission gearing the combination with driving, driven, and intermediate members, and a friction clutch comprising two sets of disks for connecting the driven and an intermediate member together, one of the said disks being connected to rotate permanently with the driven member, of means for moving the entire clutch longitudinally with respect to the driven member, means for operating the clutch upon such movement, another clutch for connecting another of the intermediate members with the said driven member, and means for restraining either of the said intermediate members.

21. In transmission gearing the combination with driving, driven, and intermediate members, and a friction clutch comprising two sets of disks for connecting the driven and an intermediate member together, one of the said disks being connected to rotate permanently with the driven member, of means for moving the entire clutch longitudinally with respect to the driven member, an annular cam for operating the said clutch, another clutch for connecting another of the intermediate members with the said driven member, and means for restraining either of the said intermediate members.

22. In transmission gearing the combination with driving, driven, and intermediate members, and a friction clutch comprising two sets of disks for connecting the driven and an intermediate member together, one of said disks being connected to rotate permanently with the driven member, of means for moving the entire clutch longitudinally with respect to the driven member, a cam carried by the driven member for operating the said clutch upon the said movement, another clutch for connecting another of the intermediate members with the said driven member, and means for restraining either of the said intermediate members.

23. In transmission gearing the combination with a driving member and a driven member coaxially arranged therewith, of a casing secured to the said driven member, a sun gear, a planetary gear, an intermediate member carrying the same, a ring gear, and brake drums carried by the ring gear and intermediate member, all movable longitudinally with respect to the driven member and casing, of clutch mechanism arranged to be operated by, and upon, the movement of the said parts.

24. In transmission gearing the combination with a driving member and a driven member coaxially arranged therewith, of a casing secured to the said driven member, a sun gear, a planetary gear, an intermediate member carrying the same, a ring gear and brake drums carried by the ring gear and intermediate member, all movable longitudinally with respect to the driving member and casing, of clutch mechanism for connecting the intermediate member and the ring gear respectively with the said driven member, the said clutch mechanism being operated by, and upon, the longitudinal movement of the said parts.

25. Transmission gearing comprising driving and driven members, axially shiftable loosely mounted intermediate planetary-gear-carrying and ring-gear-carrying members, clutches for connecting either or both of them to the driven member, and means for so connecting either or both of them upon the axial shifting of the said gear carrying members.

26. Transmission gearing comprising driving and driven members, axially shiftable loosely mounted intermediate planetary-gear-carrying and ring-gear-carrying members, clutches for connecting either or both of them to the driven member, means for so connecting either or both of them upon the axial shifting of the said gear carrying members, brake drums carried by the said members, and a single restraining means therefor, with respect to which the said drums are adjusted by their axial movements.

27. Transmission gearing comprising driving and driven members, axially shiftable loosely mounted intermediate planetary-gear-carrying and ring-gear-carrying members, a sun gear mounted to rotate with the driving member, but axially shiftable with the said gear carrying members, clutches for connecting either or both of the said gear carrying members to the driven member, and means for so connecting either or both of them upon the axial shifting of the said gear carrying members.

28. Transmission gearing comprising driving and driven members, axially shiftable loosely mounted intermediate planetary-gear-carrying and ring-gear-carrying members, a sun gear mounted to rotate with the driven member, but axially shiftable with the said gear carrying members, clutches for connecting either or both of the said gear carrying members to the driven member, means for so connecting either or both of them upon the axial shifting of the said gear carrying members, brake drums carried by the said members, and a single restraining means therefor, with respect to which the said drums are adjusted by their axial movements.

29. In transmission gearing the combination with a driving and a driven member coaxially arranged, of a casing secured to the said driven member, a sun gear, a planetary gear, an intermediate member carrying the same, a ring gear and brake drums carried by the ring gear and intermediate member, all movable longitudinally with respect to the driving member and casing, and clutch mechanism adapted to connect the ring gear with the driven member in one position of the parts, the intermediate member with the driven member in another position of the parts, and both the ring gear and the intermediate member with the driven member in another position of the parts.

ALDEN E. OSBORN.

Witnesses:
D. HOWARD HAYWOOD,
LYMAN S. ANDREWS, Jr.